Patented Jan. 19, 1937

2,067,971

UNITED STATES PATENT OFFICE 2,067,971

MANUFACTURE OF CHLORINATED RUBBER

Frederick Peacock Leach, Frodsham, and Wilfrid Devonshire Spencer, Widnes, England, assignors to Imperial Chemical Industries Limited, a corporation of Great Britain No Drawing. Application December 13, 1934, Serial No. 757,376. In Great Britain December 20, 1933

2 Claims. (Cl. 260—1)

This invention relates to an improved process for the manufacture of chlorinated rubber products.

It is well known that the chlorination of rubber in a suitable solvent, such as carbon tetrachloride, yields a solution of chlorinated rubber from which a solid product may be obtained by vaporization of the solvent or by precipitation by adding a liquid, such as alcohol which is a non-solvent for the chlorinated rubber and miscible with the solvent, to the chlorinated rubber solution. The precipitation methods hitherto employed, however, have suffered from two disadvantages in commercial operation; firstly, solid products free from solvent have not been obtained consistently, and secondly, the economic recovery of the solvent and precipitant for further use has not been provided for.

According to the present invention, solid chlorinated rubber products are prepared by contacting a solution of chlorinated rubber with an excess of a liquid precipitant maintained in a state of agitation. Preferably the solution of chlorinated rubber is added in small amounts at a time or as a thin stream to a large volume of the precipitant. By the term precipitant we mean such liquids as are without chemical action on chlorinated rubber and which mix with the solvent in the chlorinated rubber solution to produce a mixture having substantially no solvent power for chlorinated rubber.

It is important that the chlorintaed rubber solution should be treated with an excess of the precipitant, otherwise a solid product is obtained containing an appreciable amount of solvent. The presence of this solvent in the solid product constitutes a disadvantage, as its removal by direct evaporation without impairing the quality of the final product is a matter of some difficulty. The provision of suitable agitation during the precipitation assists to a marked degree in obtaining the solid product in a segregated form which is easy to wash and dry. When there is no excess of precipitant and no agitation, the solid chlorinated rubber is obtained in lumps which are difficult to treat in the subsequent operations.

The process is preferably carried out using a carbon tetrachloride solution of chlorinated rubber such as is obtained by chlorination of rubber in that solvent. In this case we have found that the lower aliphatic alcohols, for example methyl alcohol, are suitable precipitants. The complete precipitation of the chlorinated rubber does not occur instantaneously and, in general, we have found that it is advisable to allow a period of about one hour preferably with stirring for this operation. The time required, however, is affected to some extent by the viscosity of the chlorinated rubber, and with batches of high viscosity a longer period should be allowed for precipitation.

A suitable method of bringing the chlorinated rubber solution into contact with the precipitant is to squirt the solution as a thin stream or in a finely divided form through nozzles, which may project the solution on to the surface, or introduce it below the surface of the agitated precipitant. In this manner the solid chlorinated rubber is obtained in a form in which it can be easily removed from the mixed solvent and precipitant by filtration or draining. When freed from adherent mixture the product may, if desired, be washed and dried. The washing of the precipitated chlorinated rubber is preferably carried out with methyl alcohol as this tends to improve the stability of the product.

As a result of the process step described above, there is produced in addition to the desired chlorinated rubber product, a mixture of the solvent and precipitant which, in itself, cannot be used for carrying on the manufacture. Accordingly, a further step in the process comprises the separation and recovery of the solvent and precipitant for re-use.

In the preferred form in which carbon tetrachloride is the solvent and a lower aliphatic alcohol the precipitant, recovery is conveniently carried out by subjecting the mixture from the precipitation step to a distillation process in which a constant boiling mixture of carbon tetrachloride and alcohol is separated from residual alcohol. This residual alcohol contains impurities, apparently of a resinous nature, which have been extracted from the chlorinated rubber, and is therefore subjected to a further distillation whereby pure alcohol is recovered, the impurities being discarded. The constant boiling mixture of carbon tetrachloride and alcohol is treated with water, thus separating the carbon tetrachloride as a layer which can be drawn off for re-use, and forming a mixture of alcohol and water. Pure alcohol is then separated from the water by distillation and returned to the process while the residual alcoholic water is used for the treatment of further quantities of the constant boiling carbon tetrachloride-alcohol mixture.

The following example illustrates one method of carrying out the invention. The parts are by weight.

Example 100 parts of a 10% solution of chlorinated rubber in carbon tetrachloride were run gradually, in a thin stream, into a vessel containing 200 parts of methyl alcohol kept in a state of vigorous agitation by an ordinary stirring arrangement. During the addition of the solution the solid chlorinated rubber precipitated in the form of white opaque threads which were rapidly broken up into short pieces. When all the solution had been introduced the agitation was continued for a short time until the supernatant liquid was clear. The mixture of carbon tetrachloride and methyl alcohol was then drained off, a further quantity of methyl alcohol added and the solid product thoroughly washed by agitation.

The whole charge was then run out on to a filter and the methyl alcohol drained off and reserved for the precipitation of another batch of chlorinated rubber. The solid was then treated with steam to remove the adherent alcohol and finally dried in a current of warm air at about 75° C. to yield 10 parts of white chlorinated rubber. The washing step with the methyl alcohol could have been omitted if desired.

The mixture of carbon tetrachloride and methyl alcohol was fed to a distillation column from which a constant boiling mixture containing about 90 parts of carbon tetrachloride and 25 parts of methyl alcohol distilled off, leaving a residue of about 175 parts of methyl alcohol and dissolved resin. This was distilled and the alcohol recovered by condensation for re-use, the resin being discarded.

The constant boiling mixture was agitated with about 10% of its weight of water and then allowed to stand. Two liquid layers formed, the bottom layer consisting of carbon tetrachloride being drawn off and stored for subsequent use in the chlorination of the rubber. The upper layer containing the methyl alcohol was transferred to still where the alcohol was distilled off and condensed for further use, while the water left containing a small amount of alcohol was reserved for the treatment of a further batch of constant boiling mixture.

We claim:

1. A process for the preparation of solid chlorinated rubber products, which comprises projecting a carbon tetrachloride solution of chlorinated rubber in a thin stream into an excess of a lower aliphatic alcohol which is maintained in a state of vigorous agitation sufficient to maintain the precipitate in a segregated finely divided form.

2. A process for the preparation of solid chlorinated rubber products, which comprises projecting a carbon tetrachloride solution of chlorinated rubber in a thin stream into an excess of methyl alcohol which is maintained in a state of vigorous agitation sufficient to maintain the precipitate in a segregated finely divided form.

FREDERICK PEACOCK LEACH.
WILFRID DEVONSHIRE SPENCER.